(12) United States Patent
Herrmann

(10) Patent No.: US 8,393,743 B2
(45) Date of Patent: Mar. 12, 2013

(54) SEALING WITH FOAM CARTRIDGE

(75) Inventor: Andreas Herrmann, Winnenden (DE)

(73) Assignee: SMR Patents S.a.r.l., Luxembourg (LU)

( * ) Notice: Subject to any disclaimer, the term of this patent is extended or adjusted under 35 U.S.C. 154(b) by 268 days.

(21) Appl. No.: 12/763,247

(22) Filed: Apr. 20, 2010

(65) Prior Publication Data

US 2010/0265603 A1     Oct. 21, 2010

(30) Foreign Application Priority Data

Apr. 20, 2009    (DE) .................. 10 2009 019 085

(51) Int. Cl.
    *G02B 7/18*           (2006.01)
(52) U.S. Cl. ........................................ 359/871; 248/494
(58) Field of Classification Search .......... 359/871–877, 359/881; 248/476–498
See application file for complete search history.

(56) References Cited

U.S. PATENT DOCUMENTS

| 6,969,038 | B1 * | 11/2005 | Birgden et al. ............ 248/475.1 |
| 7,189,796 | B2 * | 3/2007 | Mitsunaga et al. ........... 528/196 |
| 7,690,615 | B2 | 4/2010 | Nakazawa |

FOREIGN PATENT DOCUMENTS

| DE | 3838655 | 5/1990 |
| DE | 102004014776 | 10/2005 |

OTHER PUBLICATIONS

German Search Report for German Patent Application 10 2009 019 085.6-51 dated Nov. 20, 2009.

\* cited by examiner

*Primary Examiner* — Jennifer L. Doak

(74) *Attorney, Agent, or Firm* — Reising Ethington P.C.

(57) ABSTRACT

A rear-view mirror with foam-backed door seal is presented that fills the space between mirror base and vehicle with a foam in a simple way upon its being mounted to a vehicle.

7 Claims, 4 Drawing Sheets

SEALING WITH FOAM CARTRIDGE

BACKGROUND OF THE INVENTION

The invention is based on a priority patent application DE 10 2009 019 085.6 which is hereby incorporated by reference.

1. Field of the Invention

The present invention concerns a rear-view mirror with a mirror seal that is arranged between a mirror base of the rear-view mirror and a car body.

2. Description of the Related Art

In general, a rear-view mirror of a vehicle is installed in such a way that a base carrying the mirror body is affixed to a fastening seat that is attached to the door or to the car body, with fasteners such as nuts and bolts. In this way, a seal normally comes to bear between the mirror base and the fastening seat of the vehicle. The mirror seal of this type consists of a flexible material such as polyvinyl chloride and the like. The conventional rear-view mirror seals are equipped with a sealing structure for sealing the recess in relation to the fastening seat of the car body.

One of these embodiments according to the prior art is depicted in FIG. 2. FIG. 2 shows the seal construction of a door mirror seal according to a conventional example, in which a continuous ridge running along the circumference of the seal 11 sticks out from the surface of the seal. The seal is located opposite the surface of the fastening seat on the vehicle. The ridge is enclosed by a gasket, which creates the sealing function. Furthermore, embodiments are known in which a door mirror seal is introduced in a laminar way between mirror base and the vehicle. The laminar sealing mat is thereby constructed according to the structure of the mirror base. It is inserted between the mirror base and the vehicle during mounting. These insulating materials consist of foamed material, but can also be manufactured from recycling material. Manufacture of the sealing mats and achievement of the sealing and insulating function is described in DE 60306053. The seal has a special lip seal and does without strongly compressible materials.

From the prior art, from DE 102004014776 A1, it is likewise known how to use 2-component plastics that serve as foam for energy absorption.

SUMMARY OF THE INVENTION

The object of the mirror seal is to guarantee a vibration-free seat for the mirror base on the vehicle and at the same time to prevent intrusion of moisture.

It is an object of the present invention to make a sealing system available that fulfils the objects of a seal in a simple way and simplifies assembly.

The foam-backed door seal according to the invention achieves the object of the invention by the use of a foam cartridge. The use of foam cartridges and foaming technologies is known in the prior art. In order to decrease the noise level in a vehicle, the hollow spaces in the body are filled with foam as an anti-drumming compound. These hollow spaces are, in part, not easily accessible and awkwardly-shaped. Foremost among these are the A-, B- and C-columns, as well as body carriers. A device and a procedure for foaming hollow spaces are known from DE3838655. In this, a sleeve section is inserted, from out of which the foam component mixture is introduced. Automatic methods or also a hand cartridge are thereby used.

In contrast to this, the solution according to the invention uses prefabricated foam cartridges.

The solution to the object and the embodiment will be described in more detail in the following specifications.

DETAILED DESCRIPTION OF THE DRAWINGS

Figure 1:
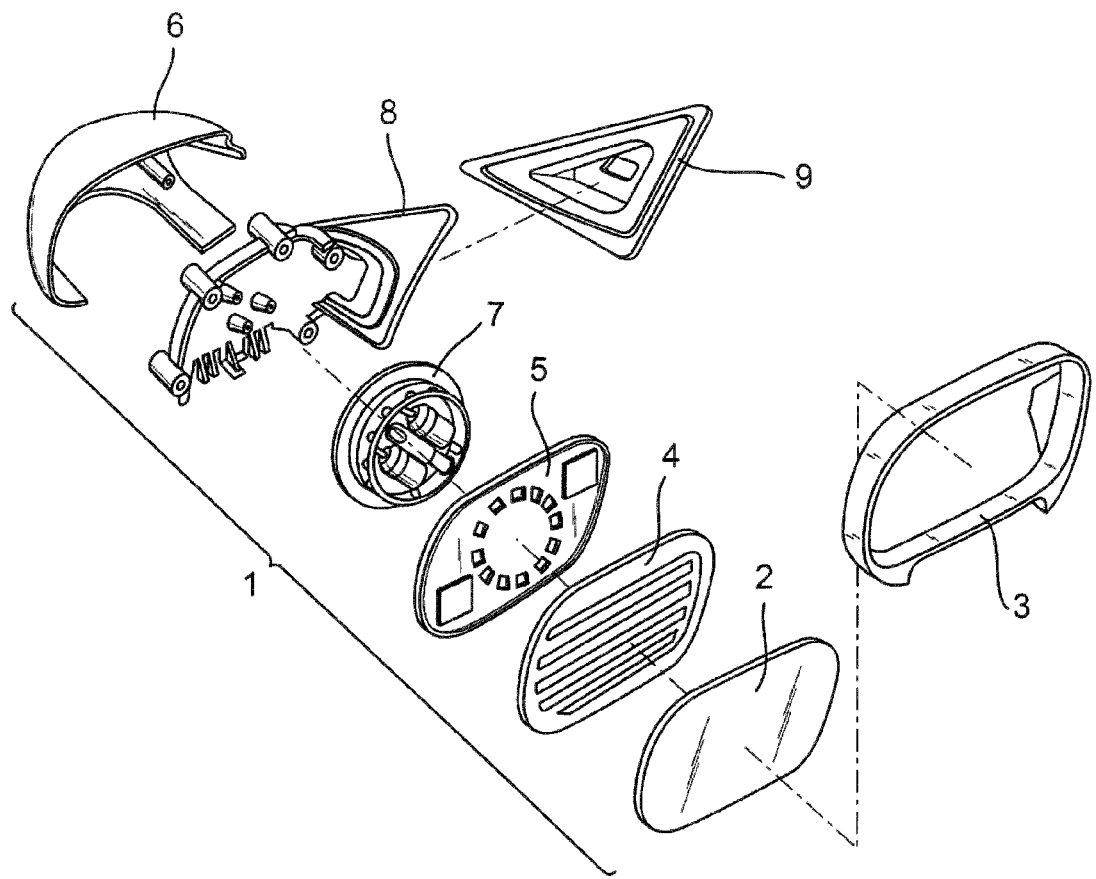
FIG. 1 shows an example of the construction of a rear-view mirror.
Figure 2:
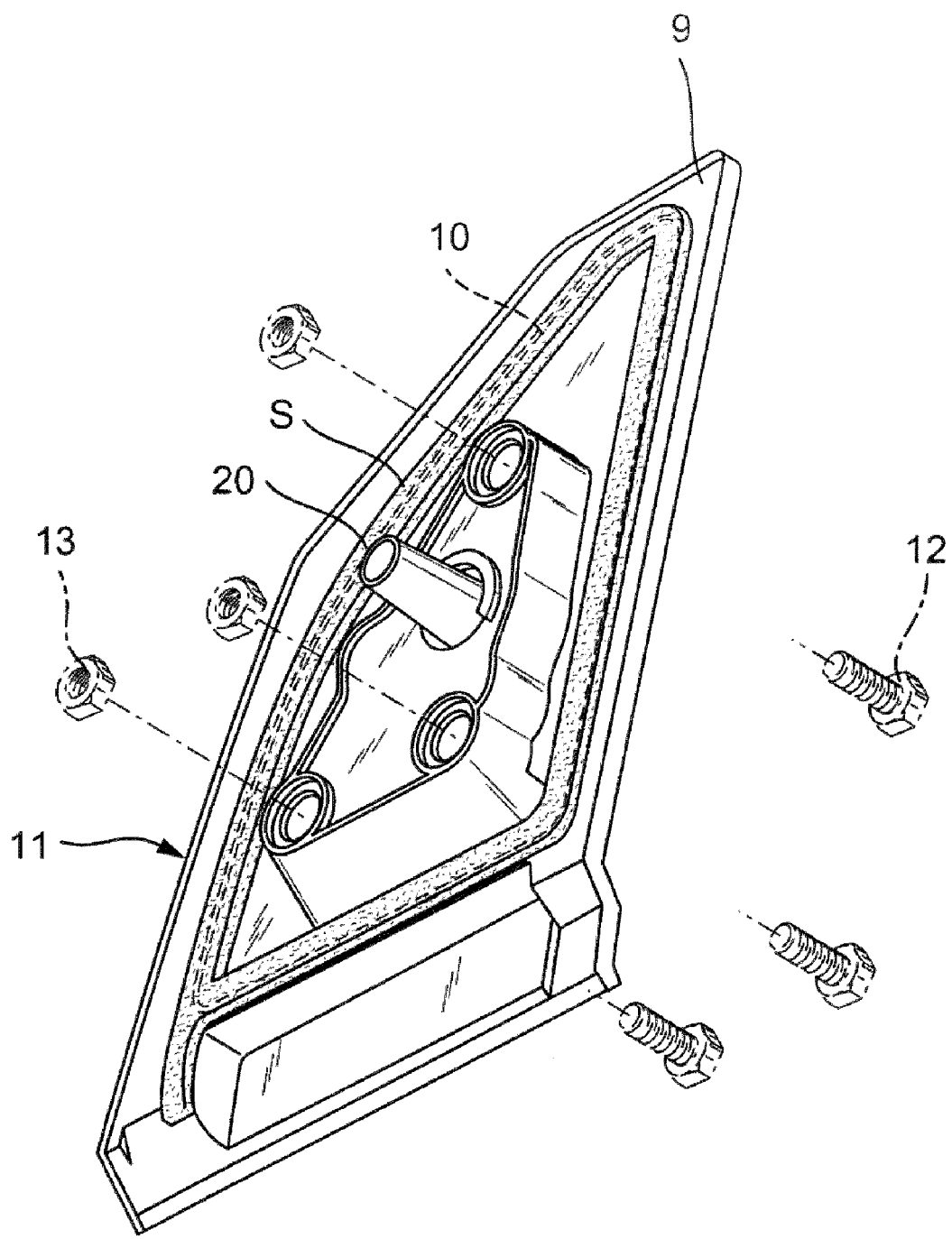
FIG. 2 shows a foam seal in the prior art.

FIG. 1 shows a rear-view mirror 1 in exploded view. The rear-view mirror 1 contains a mirror glass 2 that is enclosed in a plastic component, a mirror frame 3. The mirror glass 2 is seated on a mirror glass carrier 5 with an optional heating surface 4. The mirror glass carrier 5 is joined to an optional glass mover 7. The whole construction is mounted on a mirror carrier 8 and covered by a mirror housing 6. The mirror carrier 5 is mounted on a mirror base 9. The exact construction of the rear-view mirror 1 and its configuration is not important for the design of the invention. The mirror base 9 is the contact surface, which is screwed to the vehicle, as is shown by way of example in FIG. 2. The mirror base 9 is thereby screwed onto the fastening seat of the vehicle 17. The example has three bolts 12, which when screwed into counternuts 13 fasten the mirror head to the carrying plate 8. The mirror base 9 itself is screwed onto the vehicle 17 via the screw boss 20. It has a groove 10, into which a circumferential seal 11 is installed.

Figure 3:
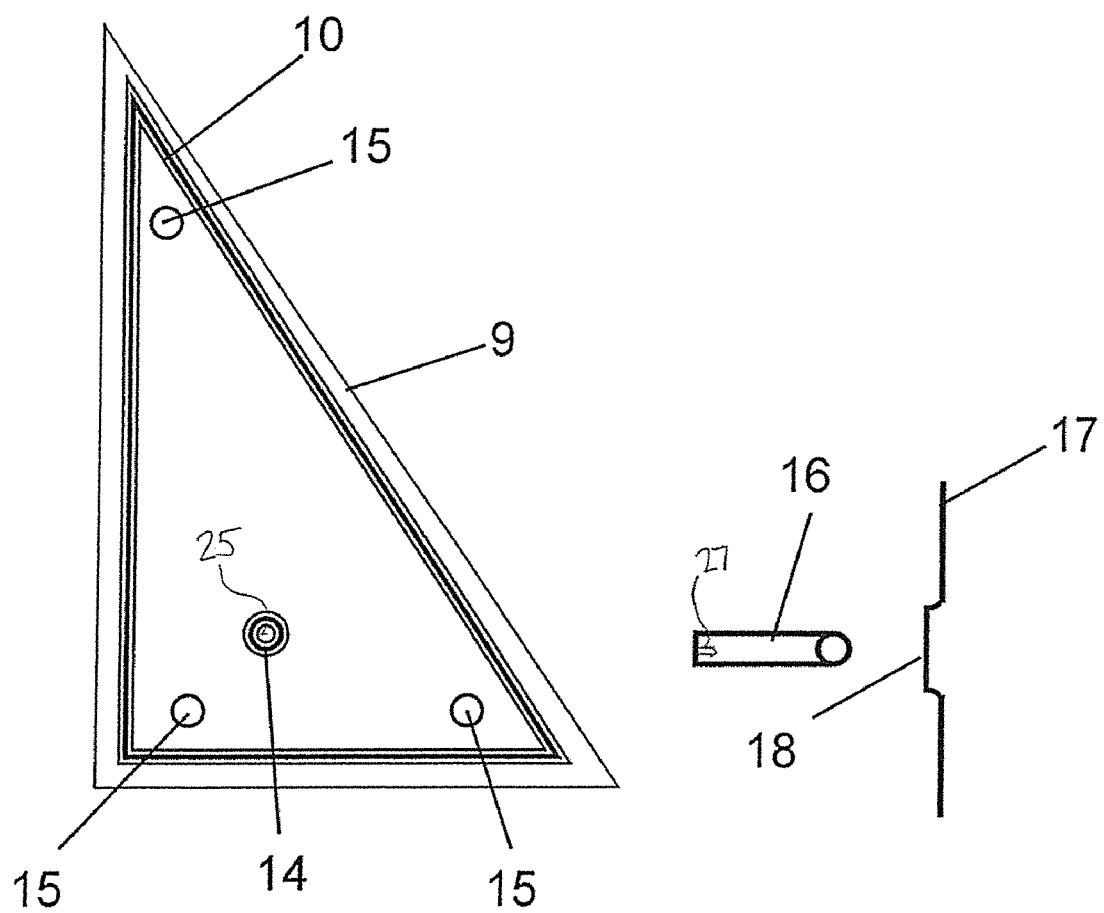
FIG. 3 schematically shows the solution according to the invention.

In contrast to this prior art, the mirror base according to FIG. 3 has no groove for receiving a seal. Rather, the mirror base has a ridge 19 that follows the contour of the mirror base 9. This ridge 19 serves as a barrier in order to prevent the sealant foam applied from escaping therepast.

In an embodiment, the ridge 19 follows the contour of the mirror base 9; the ridge 19 can, however, enclose a central area of the mirror base 9. A design of the mirror base 9 with a groove 10 and a ridge 19, as well as with several ridges, is likewise possible. The only aim 1s to optimally apportion the emergent sealant foam while preventing the emergence of the sealant foam out of the area behind or under the mirror base 9. In order to apportion this sealant foam, it is therefore also advantageous to introduce star-shaped structures in the mirror base that extend from the foam's outlet opening.

In the mirror base 9, on the vehicle side an inlet 14 is provided, into which a small-dimensioned foam cartridge 16 can be fitted. This foam cartridge 16 contains a mixture that generates sealant foam of the volume of the hollow space to be filled either through a chemical reaction or through compressed gas. In order to foam a standard mirror base, volumes of 10-20 cubic centimetres are necessary. The vehicle 17 has a pressure-loaded area 18 on the installation site, which is necessary as a counter bearing for generation of the necessary triggering pressure. Upon assembly of the mirror according to the invention, the mirror base is equipped with the foam cartridge. The inlet 14 in the mirror base 9 has a triggering device. In normal cases this is a pin 25 that opens the cartridge valve 27. The mirror base with the cartridge is attached to the vehicle and screwed on with bolts as in the prior art. As soon as the gap between mirror base and vehicle is small enough for the pressure on the outlet valve 27 of the cartridge to be big enough, then the foam formation is triggered. Care should thereby be taken that the bolting on is carried out equally on all three corners of the mirror base.

Figure 4:
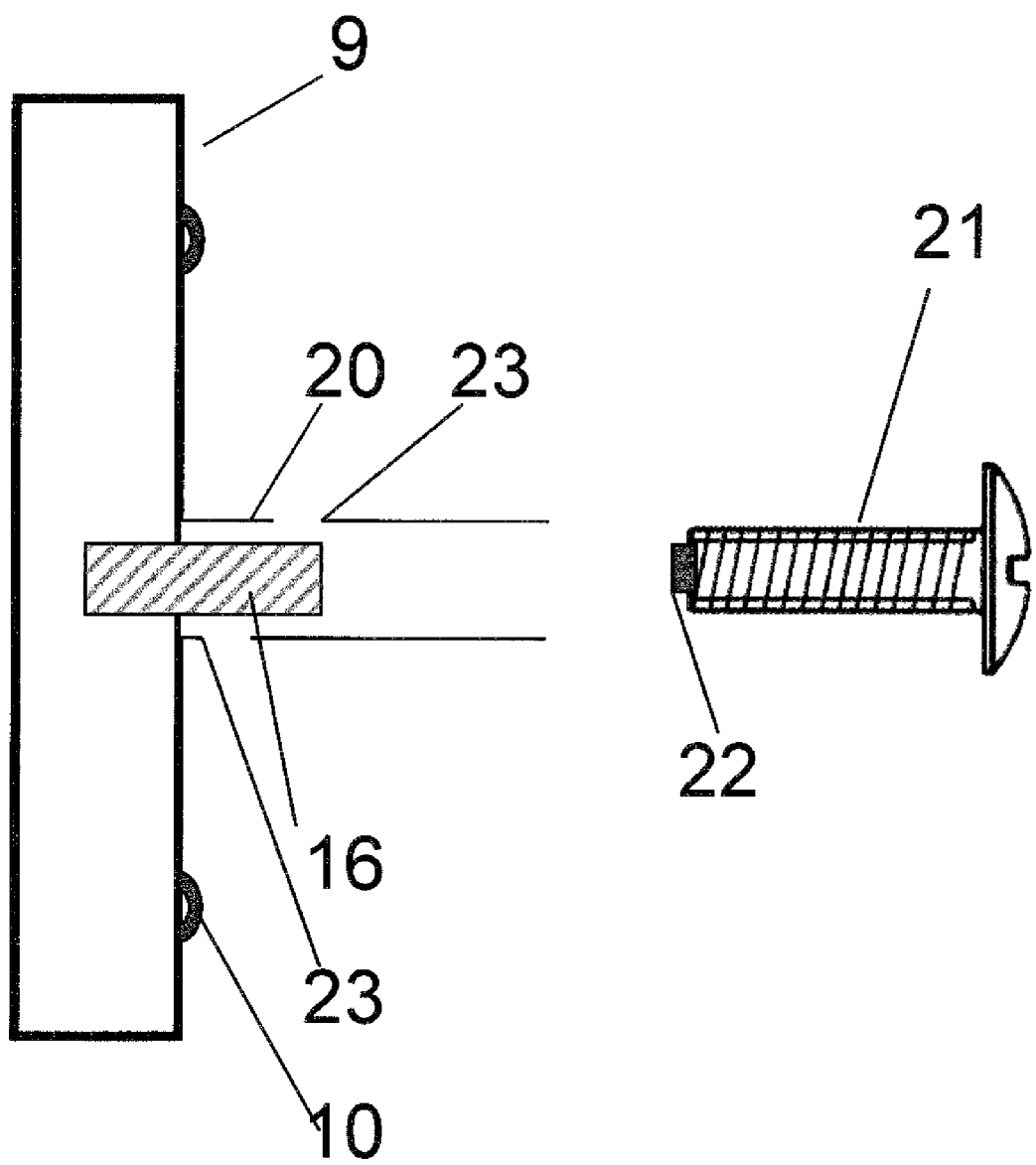
FIG. 4 shows a further embodiment of the invention.

In another embodiment according to FIG. 4, the mirror base 9 is only fastened onto the vehicle with one central bolt 21, or with two bolts. The central bolting on is thereby set up in such a way that the mirror base 9 has a screw boss 22. The foam cartridge 16 finds an inlet 20 for it in the screw boss 22 Upon triggering of the cartridge 16 the foam exits through openings 23 provided in the inlet 20. In this embodiment, the triggering of the compressed cartridge is given by the pressure of the bolt 21 that has a triggering device 22 on its point. As a result of this, the counter bearing on the vehicle side is no longer needed. The bolt 21 that joins the vehicle and the mirror base triggers the cartridge valve in a particular position. The foam exits via the openings 23 in the inlet 20 and is apportioned while the bolt 21 is tightened up to the fastening seat.

In order to create sufficient room for the cartridge, in a further embodiment we provide a bush that extends the screw boss to the base. Through this more space is created for the cartridge, and the arrangement of the exit openings is improved.

Legend:
1 Rear-view mirror
2 Mirror glass
3 Mirror frame
4 Heating
5 Mirror glass carrier
6 Housing
7 Glass mover
8 Mirror carrier
9 Mirror base
10 Groove
11 Lip seal
12 Bolts
13 Nuts
14 Inlet
15 Bolting-on points
16 Foam cartridge
17 Vehicle
18 Pressure-loaded point
19 Ridge
20 Screw boss
21 Screw to the vehicle
22 Triggering device
23 Outlet opening

The invention claimed is:

1. A rear-view mirror assembly for a motor vehicle, said rear-view mirror assembly comprising:
   a mirror base fixedly securable to a side of the motor vehicle, said mirror base defining an inlet, said mirror base creating a hollow space between said mirror base and the side of the motor vehicle when said mirror base is fixedly secured to the side of the motor vehicle;
   a foam cartridge inserted into said inlet, said foam cartridge remaining within said inlet of said mirror base after said mirror base is fixedly secured to the side of the motor vehicle; and
   a triggering device for releasing foam from said foam cartridge into the hollow space as said mirror base is fixedly secured to the motor vehicle.

2. A rear-view mirror assembly according to claim 1, wherein said mirror base has at least one ridge following its outer contour.

3. A rear-view mirror assembly according to claim 1, wherein said inlet contains a pin for activating a valve of said foam cartridge.

4. A rear-view mirror assembly according to claim 3, wherein said foam cartridge presses onto an abutment on the side of the motor vehicle.

5. A rear-view mirror assembly according to claim 2, wherein said triggering device includes a bolt, wherein said bolt also connects said mirror base to the motor vehicle.

6. A rear-view mirror assembly according to claim 5, wherein said triggering device includes a screw boss extending out from said bolt used to secure said mirror base to the motor vehicle.

7. A rear-view mirror assembly according to claim 6, wherein said inlet includes openings to assist transfer of the foam out of said foam cartridge into the hollow space between said mirror base and the side of the motor vehicle.

* * * * *